US009148521B2

(12) United States Patent
Mohan et al.

(10) Patent No.: US 9,148,521 B2
(45) Date of Patent: Sep. 29, 2015

(54) METHODS AND SYSTEMS FOR CATEGORIZING A CUSTOMER OF A SERVICE AS A CHURNER OF A NON-CHURNER

(75) Inventors: Saravanan Mohan, Chennai (IN); Vijay Raajaa Sundara Raja Moorhty, Madurai (IN)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/495,667

(22) Filed: Jun. 13, 2012

(65) Prior Publication Data
US 2013/0279672 A1 Oct. 24, 2013

(30) Foreign Application Priority Data
Apr. 18, 2012 (IN) ............................ 1205/DEL/2012

(51) Int. Cl.
H04M 15/06 (2006.01)
H04M 15/00 (2006.01)
G06Q 10/06 (2012.01)

(52) U.S. Cl.
CPC ........... H04M 15/58 (2013.01); G06Q 10/0635 (2013.01); H04M 15/47 (2013.01); H04M 15/06 (2013.01)

(58) Field of Classification Search
CPC ..... H04M 15/41; H04M 15/43; H04M 15/49; H04M 15/58; H04M 3/2218; H04M 3/4878; H04M 15/00; G06Q 50/01; G06Q 30/02; G06Q 10/10; G06Q 30/0224; G06N 7/02

USPC .................................................. 379/133–141
See application file for complete search history.

(56) References Cited

U.S. PATENT DOCUMENTS

| 5,822,410 | A | * | 10/1998 | McCausland et al. ... 379/114.01 |
| 8,385,906 | B2 | * | 2/2013 | Kumar et al. .............. 455/422.1 |
| 2007/0185867 | A1 | * | 8/2007 | Maga et al. ....................... 707/6 |
| 2009/0190729 | A1 | * | 7/2009 | Chakraborty et al. ... 379/112.01 |
| 2010/0064049 | A1 | * | 3/2010 | Magharei et al. ............. 709/229 |

OTHER PUBLICATIONS

Christine Kiss, Martin Bichler, Identification of influencers-Measuring influence in customer networks; 2008, pp. 233-253.*
"On Economic Heavy Hitters: Shapley value analysis of 95th-percentile pricing", Rade Stanojevic, pp. 75-80, Nov. 1-3, 2010.*
"Evolutionary Churn Prediction in Mobile Networks Using Hybrid Learning", V. Yeshwanth, pp. 471-476, 2011.*

* cited by examiner

*Primary Examiner* — Duc Nguyen
*Assistant Examiner* — Assad Mohammed
(74) *Attorney, Agent, or Firm* — Patent Portfolio Builders, PLLC

(57) ABSTRACT

In one particular aspect a method for categorizing a user of a communication service as a churner or non-churner is provided. In some embodiments, the method includes obtaining call data for the user. Next, the call data is used to determine a value (v1) for a graph parameter for the user, the graph parameter being one of: (a) an out-degree parameter, (b) a Shapley Value parameter, (c) a proximity prestige parameter, and (d) closeness centrality parameter. Next, the determined value (v1) is used to determine a churn value (cv). The churn value (cv) is then used to categorize the user as a churner or a non-churner.

30 Claims, 13 Drawing Sheets

METHODS AND SYSTEMS FOR CATEGORIZING A CUSTOMER OF A SERVICE AS A CHURNER OF A NON-CHURNER

CROSS-REFERENCE TO RELATED APPLICATIONS

This application claims priority to Indian patent application number 1205/DEL/2012, filed on Apr. 18, 2012, which is incorporated by reference herein in its entirety.

TECHNICAL FIELD

The present disclosure relates to systems and method for categorizing a customer of a service as a churner or a non-churner.

BACKGROUND

Churn refers generally to the movement of customers from one service provider to another. As used herein a "churner" is customer of a service that unsubscribes to the service or otherwise ceases using the service. Churn is a serious problem in many industries, including the telecom industry. It is a significant problem because customer churn leads to diminished profits for the telecom operator and, perhaps, increased business for a competitor. Moreover, in some aspects, it is more important for a telecom operator to retain its existing customers than to sign-up new customers (i.e., existing customers may be more profitable than new customers given the costs involved in attracting new customers). With the continuous addition of new telecom operators in the market, and with the availability of mobile number portability service, churners are increasing at an alarming rate. Hence, telecom operators would like to identify potential churners so that improved services or other incentives may be offered to these customers in an effort to retain them.

Several methods have been proposed for predicting churners in different domains. Existing approaches to churn prediction pertain to attribute based analysis, which has proven to be relatively time consuming because the process has to be re-run every time the underlying dataset ("churn data") is fed or updated. Moreover, the proposed classification model proved to face issues with respect to skewness of the churn data. The churn data tends to be imbalanced because the churners tend to be far less in numbers in order of (2%-5%) compared to the non-churners. Due to the existence of class imbalance, the high accuracy value derived from a model in churn prediction analysis poses little or no useful result in real time. Other semi supervised approaches present in the market are not suited to the purpose because of their inherent inability to scale well for huge datasets. Also, these approaches have difficulty in parallelizing certain aspects of their algorithm, which poses a problem in applying them over a telecom dataset. Another drawback is that certain attribute based analysis was found to be specific to a particular dataset, such as data from a developed country, but the same model failed miserably for a different dataset, such as data from a developing country.

SUMMARY

In order to address at least some the above issues, there is a need for improved methods and system for predicting whether a given customer is likely to become a churner (i.e., quit using the service) in some future period of time (e.g., the next week, month or quarter). Disclosed herein are such improved methods and systems. This disclosure, for example, discloses a method that uses graph parameter analysis to predict whether a customer of a service will be a churner (i.e., to categorize a customer as a churner or a non-churner). The disclosure is applicable to the telecom industry as well as other industries, such as: Internet service providers, cable TV providers, insurance firms, alarm monitoring services, etc.

The use of graph parameter analysis has been successful in studying the usage of websites on the Internet. Such analysis employs the ingestion of a massive data feed from websites all over the Internet. Telecom data holds close resemblance to such website data, wherein the generated data trails a power law graph and the size tends to be huge.

In this disclosure, telecom data is visualized in the form of a call graph and several call graph parameters are deduced from the graph. In some embodiments, such call graph parameters include: In-Degree, Out-Degree, Closeness centrality, Call weight, Proximity prestige, Eccentricity centrality, and Clustering coefficient, In Degree prestige, Out degree prestige, and Shapley value. These graph parameters indicate the active participation of a customer with respect to the service and thus aids in studying churn behavior over a period of time. This disclosure discloses analyzing graph parameters during a training phase to help in understanding the factors contributing to churn behavior. The graph parameters are computed from the vertex and edge pairs ((V (G), E (G)), visualized from the telecom dataset stored in a scalable graph database (graph DB) framework.

In some embodiments, the graph DB falls in the class of NOSQL database technologies. The idea of using a NOSQL DB rather than the traditional SQL relational DB is that NOSQL database technologies support a scalable and schema-less structure that helps in analyzing and storing huge datasets. In some embodiments, the method calls for querying the corresponding graph DB to obtain the graph parameters relevant to churn behavior.

While the considered graph parameters holds close relationship to the churn behavior analysis, evaluation of all the graph parameters over the huge dataset on a dynamic environment tends to be a costly process. Thus, in some embodiments, we run predictive machine learning methods that can aid in determining the specific graph parameters that contribute most significantly to the discrimination of churn behavior. The corresponding analysis can help in bringing down the list of graph parameters for identifying the visible churners quickly in a dynamic and scalable environment. Once such a list of graph parameters is determined, we can create a model (e.g., an equation) that comprises these graph parameters and use the model to categorize a customer as a churner or non-churner.

In a telecom network, a call detail record (CDR) is typically generated for every transaction (e.g., telephone call, SMS message, etc.) made using the telecom network. Accordingly, there may be billions of CDR records to be processed, and it is difficult to manipulate such a huge amount of data using a single computer. Therefore, in some embodiments, a map reduce based parallelized framework using HADOOP architecture is employed for pre-processing of CDRs over a cluster environment. The efficiency of combining the map reduce based framework with NOSQL based storage enables a scalable and dynamic platform with ease and minimal cost. Telecom service providers can use the model to categorize a customer as a churner or non-churner and then target retention campaigns to the identified churners.

According to some embodiments, methods and systems for identifying churners among a plurality of users in a communication network are disclosed. In some embodiments, the method includes: processing network data and creating a plurality of clusters; for each cluster, representing the network data in the cluster as a graphical representation such that the network data of one or more users may be represented as nodes with reference to time; generating one or more graphical representation properties; and feeding the generated graphical representation properties in a model so as to identify the features that differentiate the churners from the non-churners. Based on the identified data, graphical representations and changes in the graphical features over a specific time period, one can predict probable churners at every node.

Disclosed herein is also a computer program and a computer program product, which may be in the form of a memory and which comprises the computer program. The computer program comprises code which when run on the system, causes the system to perform a method according to any embodiment disclosed herein.

In one particular aspect a method for categorizing a user of a communication service as a churner or non-churner is provided. In some embodiments, the method includes obtaining call data for the user. Next, the call data is used to determine a value (v1) for a graph parameter for the user, the graph parameter being one of: (a) an out-degree parameter, (b) a Shapley Value parameter, (c) a proximity prestige parameter, and (d) closeness centrality parameter. Next, the determined value (v1) is used to determine a churn value (cv). The churn value (cv) is then used to categorize the user as a churner or a non-churner. That is, for example, in some embodiments, the user is categorized as a churner or non-churner based solely on the churn value (cv).

In some embodiments, the method also includes: obtaining second call data for the user, the second call data identifying communications from the user that were made during a second period of time (e.g., a second week), wherein the first call data for the user identifies communications from the user that were made during a first period of time (e.g., a first week); using the second call data to determine a value (v2) for the graph parameter; and using the determined values v1 and v2 to determine the churn value (cv). In some embodiments, the churn value is determined by calculating $c1*(v2-v1)$, wherein c1 is a predetermined constant.

The method may further include: using the first call data determining a third value (v3) for a second graph parameter for the user, the second graph parameter being one of: (a) an out-degree parameter, (b) a Shapley Value parameter, (c) a proximity prestige parameter, and (d) closeness centrality parameter; and using the second call data determining a fourth value (v4) for the second graph parameter, wherein the churn value is determined using v1, v2, v3, and v4, and the second graph parameter is different than the first graph parameter. In such an embodiment, the churn value may be determined by calculating $c1*(v2-v1)$ and $c2*(v4-v3)$, wherein c2 is a predetermined constant.

The method may further include using the first call data determining a fifth value (v5) for a third graph parameter for the user, the third graph parameter being one of: (a) an out-degree parameter, (b) a Shapley Value parameter, (c) a proximity prestige parameter, and (d) closeness centrality parameter; and using the second call data determining a sixth value (v6) for the third graph parameter, wherein the churn value is determined using v1, v2, v3, v4, v5 and v6, and the third graph parameter is different than the first graph parameter and the second graph parameter. In such an embodiment, the churn value may be determined by calculating $c1*(v2-v1)$, $c2*(v4-v3)$, and $c3*(v6-v5)$, wherein c3 is a predetermined constant.

The method may further include: using the first call data determining a seventh value (v7) for a fourth graph parameter for the user, the fourth graph parameter being one of: (a) an out-degree parameter, (b) a Shapley Value parameter, (c) a proximity prestige parameter, and (d) closeness centrality parameter; and using the second call data determining an eighth value (v8) for the fourth graph parameter, wherein the churn value is determined using v1, v2, v3, v4, v5, v6, v7 and v8 and the fourth graph parameter is different than the first graph parameter, the second graph parameter, and the third graph parameter. In such an embodiment, the churn value may be determined by calculating $c1*(v2-v1)$, $c2*(v4-v3)$, $c3*(v6-v5)$, $c4*(v8-v7)$ wherein c4 is a predetermined constant, or by calculating $c5+c1*(v2-v1)+c2*(v4-v3)+c3*(v6-v5)+c4*(v8-v7)$, wherein c4 and c5 is a predetermined constant.

In another aspect, a churn detector is provided. In some embodiments, the churn detector is configured to: obtain call data for a user; use the call data to determine a value (v1) for a graph parameter for the user, the graph parameter being one of: (a) an out-degree parameter, (b) a Shapley Value parameter, (c) a proximity prestige parameter, and (d) closeness centrality parameter; use the determined value (v1) to determine a churn value (cv); and categorize the user as a churner or a non-churner based on said churn value.

Other aspects, embodiments, and features are described below.

BRIEF DESCRIPTION OF DRAWINGS

Embodiments will now be described in more detail in relation to the accompanying drawings, in which.

DETAILED DESCRIPTION

Figure 1:
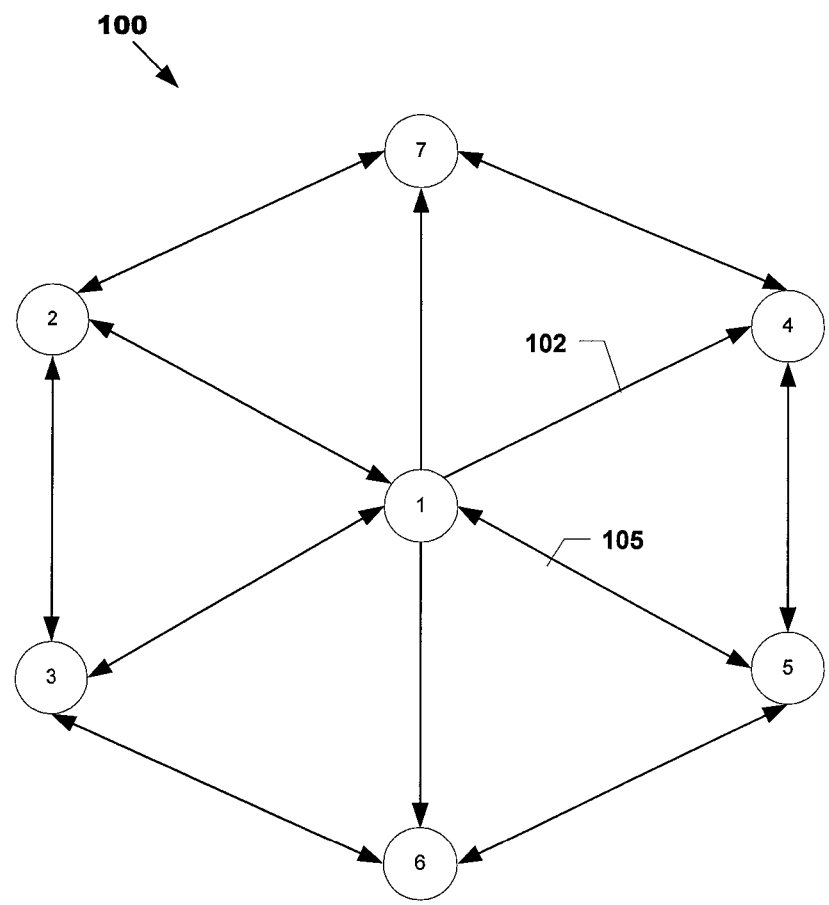
FIG. 1 illustrates an example call graph created from call data pertaining to a first period of time.

FIG. 1 illustrates an example call graph 100 created from call data (e.g., CDRs) pertaining to a particular telecom service and pertaining to a particular period of time (P1). P1 may be a day, a week, a month or some other period. At least some of the nodes (a.k.a., "vertices") of the call graph 100 represent a customer of the telecom service. For example, nodes 2 and 5 may each represent a different customer of the telecom service. The edges of the graph (i.e., the lines connecting the nodes) represent communications between customers. More specifically, a line connecting a first node with a second node and having only a single arrow at one end represents that the customer associated with one of the nodes has initiated a communication (phone call, text message, e-mail) to the other customer associated with the other node, and represents that the other customer has not initiated any communications to the first customer. For example, edge 102 indicates that the customer associated with node 1 ("customer 1") has, within the period P1, initiated at least one communication to customer 4, but customer 4 has not, within the period P1, initiated any communication to customer 1. As another example, edge 105 indicates that customer 1 has, within the period P1, initiated at least one communication to customer 5, and customer 5 has, within the period P1, initiated at least one communication to customer 1.

Figure 2:
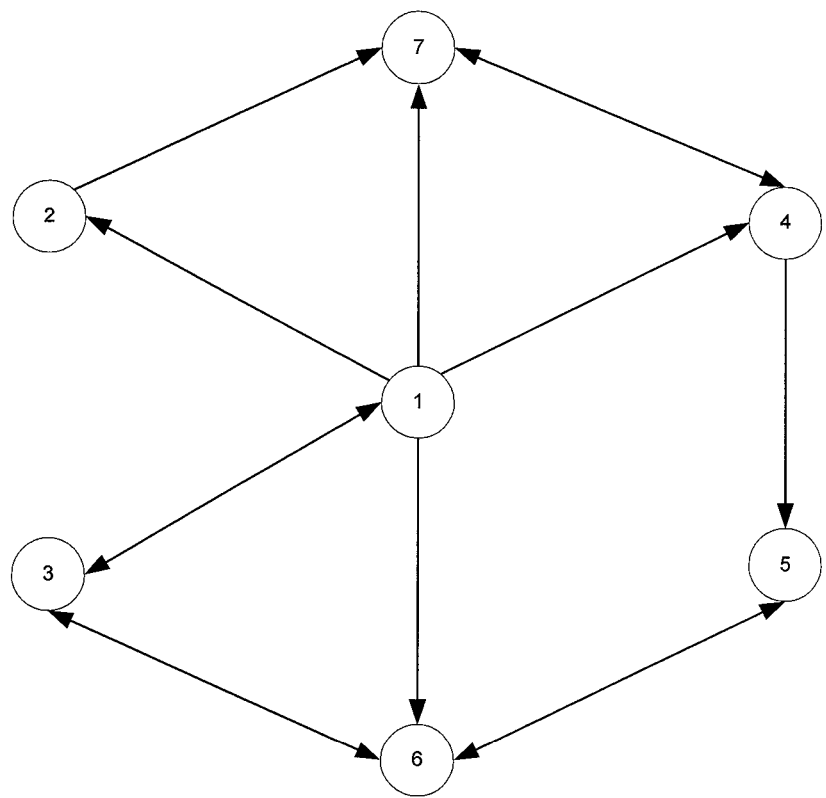
FIG. 2 illustrates an example call graph created from call data for a second period of time.

FIG. 2 illustrates an example call graph 200 created from call data pertaining to the telecom service and pertaining to a period of time (P2). In this example, P2 immediately follows P1. Likewise, FIG. 3 illustrates an example call graph 300 created from call data pertaining to the telecom service and pertaining to a period of time (P3), which immediately follows P2.

Figure 3:
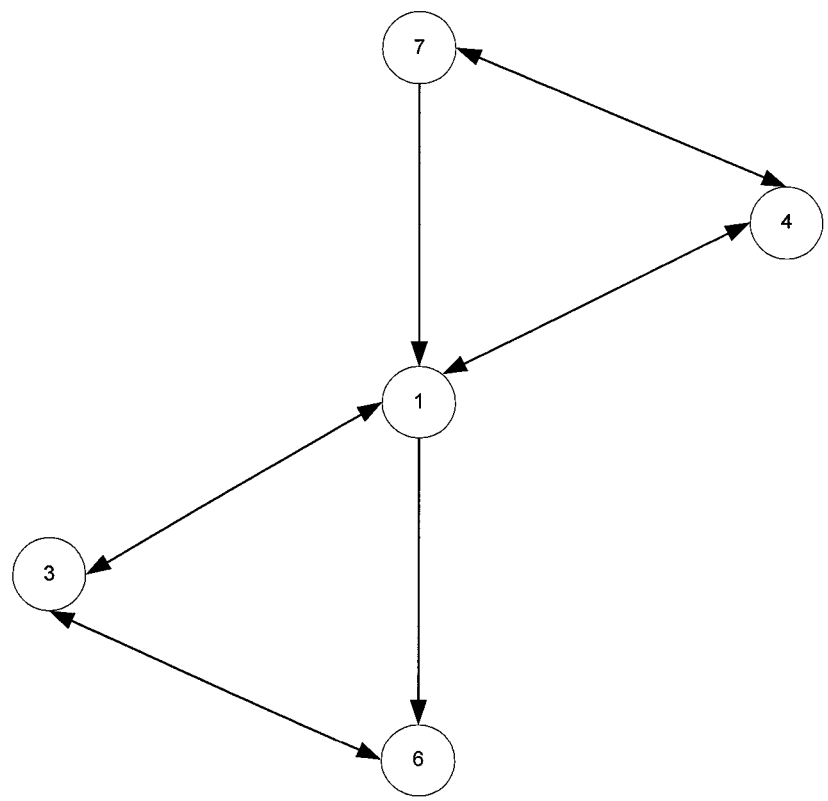
FIG. 3 illustrates an example call graph created from call data for a third period of time.

As illustrated in FIG. 2 and FIG. 3, at least a portion of the call graph for the telecom service changes over time, as one would expect. For example, FIG. 1 shows that in period P1, customer 2 and customer 3 communicated with each other using the telecom service, but FIG. 2 shows that, customer 2 and customer 3 did not communicate with each other using the telecom service during period P2. FIG. 3, shows that, sometime during period P3, customers 2 and 5 churned (i.e., quit the service).

According to embodiments of this disclosure, changes in a call graph from one period to the next are analyzed to predict which, if any, of the customers represented in the call graph will churn in the subsequent period. For example, in some embodiments, properties of a call graph (i.e., "call graph properties" or "graph properties") for each user in a set of user are determined from one period to the next, and these determined graph properties for the user are used to predict whether the user will be a churner in the next period (i.e., they are used to categorize the user as a churner or a non-churner). In some embodiments, the following graph parameters are determined: In-Degree, Out-Degree, Degree prestige (DP), Closeness Centrality (CC), Proximity prestige (PP), Eccentricity centrality (EC), Clustering coefficient, and Call weight (CW). Additionally, in some embodiments, a Shapely value as well as other parameters may also be determined.

The In-degree parameter measures the number of incoming connections to a given user. To measure the in-degree of a given user (vi) we count the number of unique users who have initiated a communication with the given user.

The Out-degree parameter measures the number of outgoing connections from a given user (vi). We find the measure by counting the number of unique users to whom the given user has initiated a communication.

The Degree Prestige (DP) parameter is based on the In-degree and Out-degree parameter values, which takes into account the number of members adjacent to a particular node in the network. More prominent members can be found using this factor. In some embodiments, DP for a given customer (i) (i.e., DPi) equals:

$$DP_i = \frac{f_i}{|V|-1}$$

where fi is the number of first level neighbours adjacent to node vi.

The Closeness centrality (CC) parameter measures the importance of a user based on their "location" in the call graph. A central user will tend to have high closeness centrality; i.e. if the call graph was thought of an information passing network, then rumors initiated by a central user will spread to the whole network quicker. In some embodiments, CC for a given user (vi) equals 1/li, where li equals:

$$l_i = \frac{1}{|v|}\sum_{j \in v} d_{i,j}$$

Where di,j is the length of the shortest path between vertex vi and vertex vj.

The Proximity Prestige (PP) parameter reflects how close all members are present with respect to node x in the network. In some embodiments, PP equals:

$$PP_i = \frac{\frac{k_i}{|V|-1}}{\frac{1}{k_i}\sum_{j=1, j\in V}^{k_i} d_{i,j}}$$

where ki is the number of nodes in the network who can reach member vi

The Eccentricity Centrality (EC) parameter states the most central node in the network. It signifies that the node with high eccentricity minimizes the maximum distance to any other node in the network. EC is represented as:

$$EC(x) = \frac{1}{\max\{d_{i,j} : j \in V\}}$$

The Clustering Coefficient (CLC) represents the community density formed by a given node in the network. When a customer from a highly clustered community is likely to churn then there is a possibility that he will induce other members in the community to churn as well. It is represented as:

$$CLCi = \frac{2|\{e_{jk}\}|}{k_i(k_i-1)} : v_j, v_k \in V, e_{jk} \in E$$

where, $e_{jk}$ is the number of edges

The Call Weight (CW) parameter refers to the level of participation of a user in the network. If the level of participation decreases over a period of time, then it indicates that the user is not interested in the network and may churn out.

The Shapley value represents the influential score for a given node in the network Influential nodes are the one who are not only active in participation but also holds strong influence among their neighbouring nodes. The telecom carriers must target the influential churners with their retention scheme first to prevent them from becoming an influential churn spreader. It is represented as:

$$SV_i = \sum_{v_j \in V \cup N(v_j,d)} \frac{1}{1+deg(v_j)}$$

where $N(v_j,d)$ represents nodes with d degree of separation from node vi.

Certain graph parameter gives additional information, For instance a probable churner with high In-degree centrality is most likely to churn its neighbors because of the high influence exerted to its neighbors.

The table below, Table 1, illustrates example graph parameter values for customer 2 for periods P1 and P2. A similar table may be created for each other customer. For example, Table 2 illustrates example graph parameter values for customer 1 for periods P1, P2 and P3.

TABLE 1

| Graph Parameters | Week 1 | Week 2 |
|---|---|---|
| In-Degree | 3 | 2 |
| Out-Degree | 3 | 1 |
| InDegree-Prestige | 0.4285714 | 0.2857142 |
| OutDegree-Prestige | 0.4285714 | 0.14285714 |
| Closeness Prestige | 0.1111111 | 0.1666666 |
| Proximity Prestige | 0.5714285 | 0.2142857 |
| Eccentricity Centrality | 0.5 | 0.3333333 |
| Clustering Coefficient | 0.2 | 0.0 |

TABLE 2

| Graph Parameters | Week 1 | Week 2 | Week 3 |
|---|---|---|---|
| In-Degree | 3 | 1 | 1 |
| Out-Degree | 6 | 5 | 4 |
| InDegree-Prestige | 0.4385714 | 0.1428571 | 0.2 |
| OutDegree-Prestige | 0.8571428 | 0.7142857 | 0.8 |
| Closeness Prestige | 0.1666666 | 0.4285714 | 0.25 |
| Proximity Prestige | 0.8571428 | 0.73469387 | 0.8 |
| Eccentricity Centrality | 1.0 | 0.5 | 1.0 |
| Clustering Coefficient | 0.3333333 | 0.4 | 0.4 |

As illustrated in the Table 1, some of the graph parameter values, which are generated from the call data, changed significantly from period P1 to period P2. We surmise this is because there is a correlation between changes in one or more of a customer's graph parameters over time and whether or not the customer will churn.

To formalize this correlation and produce a model for predicting whether a customer will churn using call graph parameters we have an analysed a large set of historical CDRs spanning multiple periods. Described below is one technique for creating the model.

Figure 4:
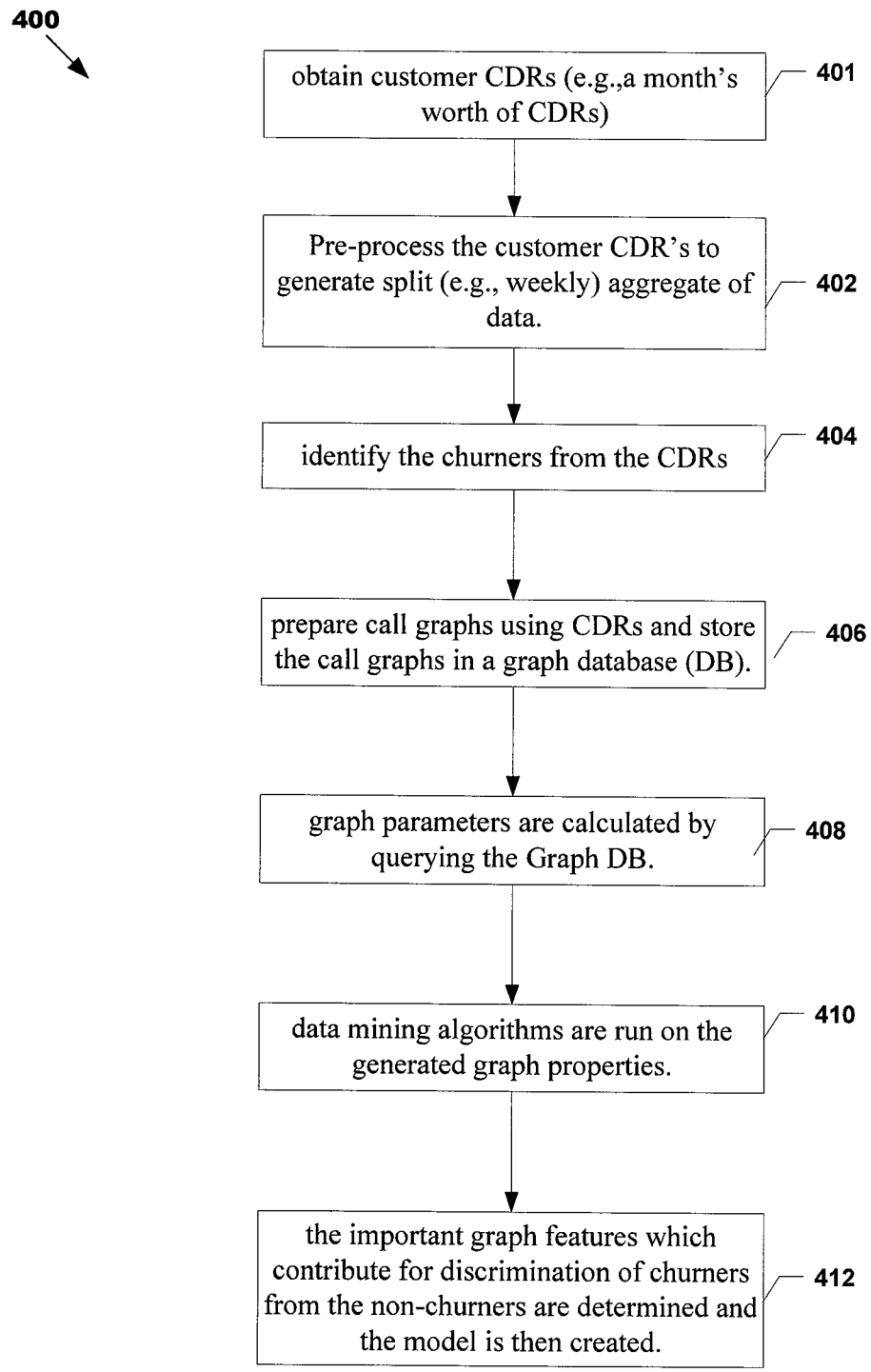
FIG. 4 illustrates a process for generating a model for predicting churners according to some embodiments.

FIG. 4 illustrates a high-level process 400 for creating a model for use in characterizing a customer as a churner or non-churner. Process 400 may begin in step 401, wherein CDRs are obtained. In step 402, the customer CDR's are pre-processed to generate split (e.g., weekly) aggregate of data. In step 404, the CDR's are inspected to identify the actual churners. In step 406, a call graph is prepared using CDRs and the call graph is stored in a graph database (DB). In step 408, graph parameters are calculated by querying the Graph DB. In step 410, data mining algorithms, like Multivariate Discriminant Analysis and Logistic Regression methods, are run on the generated graph properties. In step 412, the important graph features which contribute for discrimination of churners from the non-churners are determined and the model is then created. The model allows us to predict easily the noticeable churners in any given dynamically available dataset by observing the changes in selected graph parameters.

In some embodiments, a system for performing process 400 uses a Hadoop Map-Reduce platform. Hence, advantages of embodiments of the disclosure enable churn prediction in a dynamic and a scalable environment with ease and minimal cost. The system may employ other technologies at various steps.

For example, in some embodiments, the graph database may utilize a commercial object database produced by Objectivity, Inc. named Objectivity/DB. Such a database allows applications to make standard C++, Java, Python or Smalltalk objects persistent without having to convert the data objects into the rows and columns used by a relational database management system (RDBMS). Such a database can be used for graph visualization and storage. It is from a class of NOSQL (or Not Only SQL) data technologies focused on graph data structure that supports scalable and schema less pattern. Graph data typically consist of objects or things (nodes/vertices) and various relationships (edges) that may connect two or more nodes. The database allows applications to distribute both in ingesting (data loading) and processing tasks across virtually any number of servers and processes, in a near linear way.

Optimized Pre-Processing

As discussed above, one step of process 400 is a pre-processing step. In some embodiments, a map reduce-based parallelized framework having a Hadoop architecture may be used for pre-processing of the network data extracted from the CDRs, which is in turn used for graph computations. Advantageously, in some embodiments, the data may be distributed across a cluster, so that different portions of data are computed on physically different machines and combined at a later stage.

Figure 5:
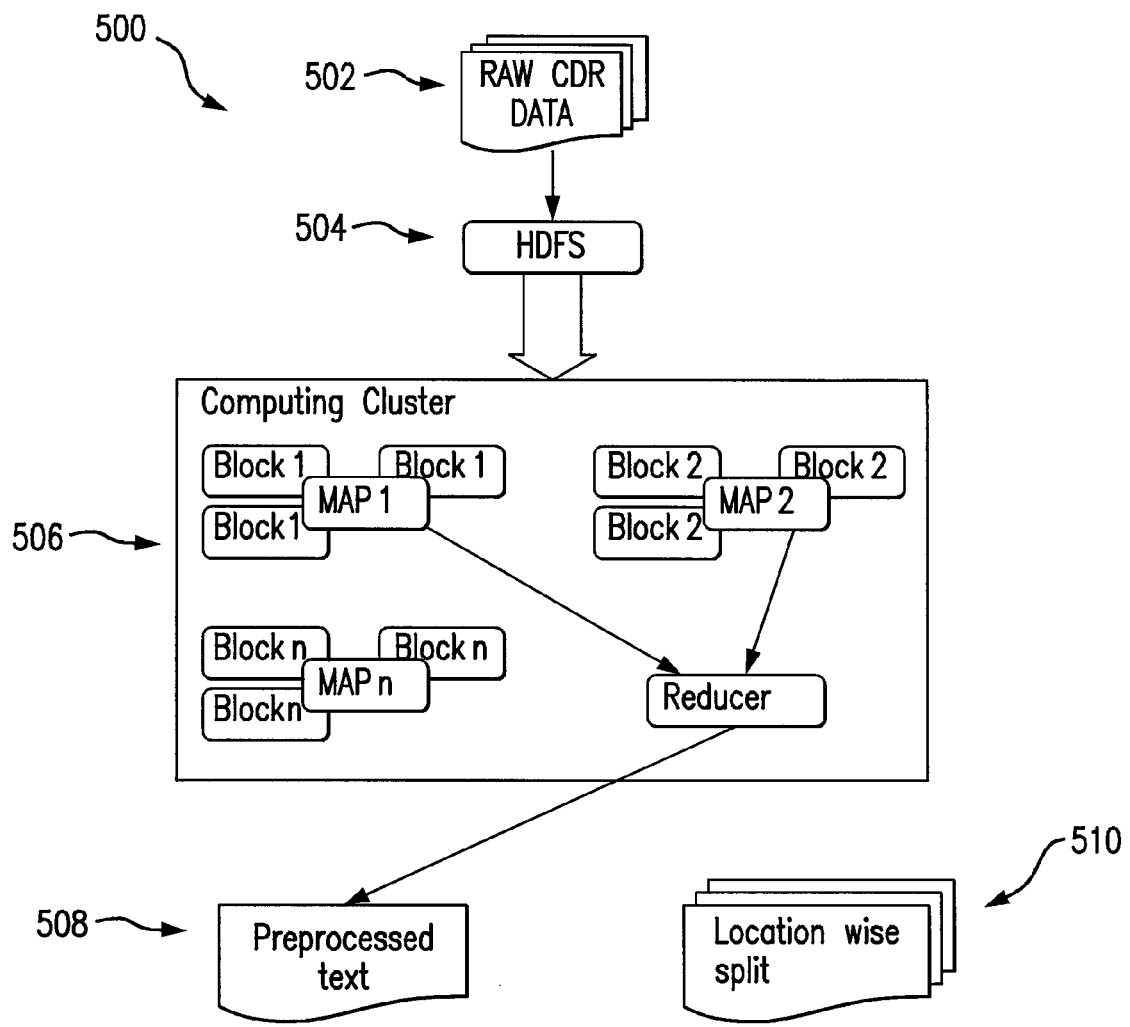
FIG. 5 illustrates a process flow for partitioning the dataset into various locations according to an exemplary embodiment.

FIG. 5 illustrates a process flow 500 for partitioning the dataset into various locations according to an exemplary embodiment of the disclosures. The process flow diagram shows that the CDRs 502 may be processed through the Hadoop Distributed File System (HDFS) 504 to ultimately produce pre-processed text 508. In a typical billing system of a telecom operator, for every operation performed by a customer (e.g., voice call, SMS usage, GPRS usage, etc.) an event is recorded and stored. These data records constitute the CDRs 502. As shown in FIG. 5, the pre-processed text 508 may then be split into chunks, location wise. For example, initially the call detail records (CDRs) may be pre-processed into eight different locations 506, which may consist of four urban and four rural places, as shown in FIG. 5. The location wise data 510 is later processed by splitting them into weekly chunks. To analyze the behavior of a customer over a particular period of time, the dataset is split into a plurality of locations and hence, the churn behavior is comprehended. Further, the details of caller and callee may be taken from the CDR data 502 for graph visualization and for any further analysis.

Linear Discrimination Analysis

Figure 7:
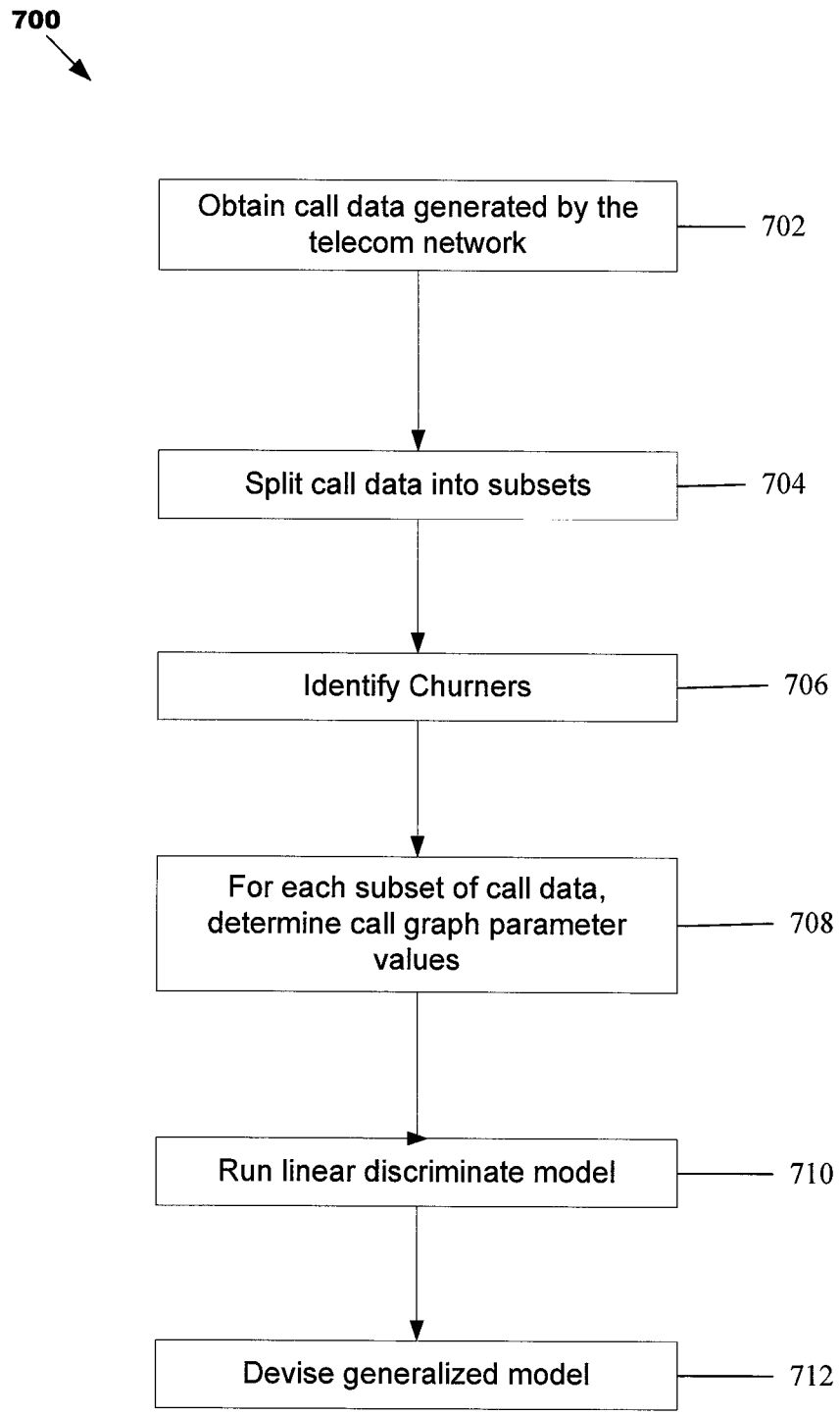
FIG. 7 illustrates a process flow 700 for identifying number of probable churners in a telecom network.

As discussed above, Linear Discriminant Analysis (LDA) may be used to determine which attributes discriminate between two or more naturally occurring groups. As illustrated in FIG. 7, the linear discriminant analysis may be used to extract graph parameters that contribute maximum to the churn behaviour. This aids in understanding the behaviour of the telecom network. A discriminant function that is a linear combination of the components of x, may be written as:

$$g(x) = w^T x + w_0$$

where w is the weight vector for different graph parameters and $w_o$ is the threshold weight and $W^T$ refers to transpose of weight matrix.

The steps performed during Linear Discriminant Analysis are described. The first step is a group definition step. That is, the first step may be to form two groups namely: churners and non-churners. The next step is to define a discriminating function. In principle, any mathematical function may be used a discriminating function. In case of LDA, a linear function of the form:

$$y = a_0 + a_1 x_1 + a_2 x_2 + \ldots + a_n x_n$$

may be used, with xi being the graph parameter derived from the CDR data set. The parameters ai may be determined in such a way that the discrimination between the groups is at its best.

In the third step, selected graph parameter output may be calculated for the split up data as the value of the discriminating function.

According to another embodiment, the Modified Logistic Regression may be used to devise a generalized model in the form of Logistic function that predicts if a customer may be a churn or not depending on the independent graph parameters extracted from the Discriminant Analysis.

The Logistic Regression technique begins with an explanation of the Logistic function, which, like probabilities, always assumes values between zero and one:

$$f(z) = \frac{e^z}{e^z + 1} = \frac{1}{1 + e^{-z}}$$

The input is z and the output is f(z). The Logistic function is useful because it may take a graph parameter input value ranging from negative infinity to positive infinity, whereas the output is confined to values between 0 and 1. The output here represents if a customer is a probable churner or not. The variable z represents the exposure to some set of independent variables which is a set of extracted graph parameters, while f(z) represents the probability of an outcome. The variable z is a measure of total contribution of the entire independent graph parameters set used in the system, and is known as the logit.

The variable z is usually defined as:

$$z = \beta_0 + \beta_1 x_1 + \beta_2 x_2 + \beta_3 x_3 + \ldots + \beta_k x_k$$

where, $B_0$ is called the "intercept" and $B_1, B_2, \ldots, B_k$ are called "regression coefficients" of $x_1, x_2, \ldots, x_k$. The intercept is the value of 'z', when the value of all graph parameters is zero. Each of the regression coefficients describes the size of contribution of the graph parameter towards churn behaviour. The Logistic Regression may be one of the useful ways of describing the relationship between the extracted graph parameters tested over customer behaviour which provides an accumulated weight model to infer if the customer may churn or not.

Figure 6:
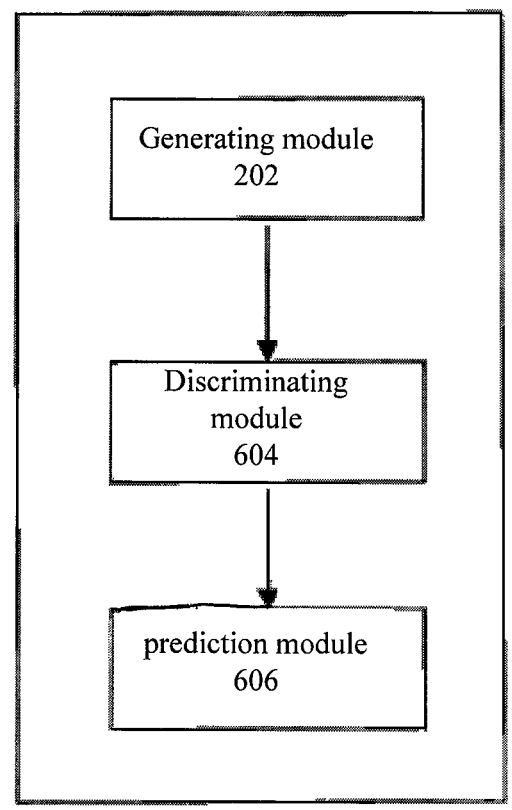
FIG. 6 illustrates a system according to an embodiment of the disclosure

FIG. 6 illustrates a system 600 according to an embodiment of the disclosure. As illustrated, the system 600 has various modules such as: a generating module 602 for generating certain graph properties for individual customers from the graph database so as to contribute in the discrimination of churners from non-churners in the telecom network. According to an embodiment, the graph properties may be analysed over a discriminating module 604 to find specific parameters that may distinguish the churners. Further, as discussed above, the graph parameters may be analysed using the Linear Discriminating Analysis for selecting the best parameters over the set of whole graph parameters. The Linear Regression model is run in a prediction module 606 of the disclosed system to derive a final equation, whose outcome predicts if a customer probably churns or not. The final equation derived by this module narrows down the parameter analysis in terms of cost and time taken, to hunt the probable number of churners in the telecom domain.

FIG. 7 illustrates a process flow 700 for identifying number of probable churners in a telecom network, according to an embodiment of the disclosure.

Process 700 may being in step 702, where call data associated with the telecom network is obtained (e.g., set of CDRs is obtained). In step 704, the call data is split into subsets (or "chunks"), where each chunk contains only data pertaining to a particular week (or other period). That is, in some embodiments, each chunk just contains a weeks worth of data. In step 706, the churners are identified from the call data. A customer is identified as a churner if the customer is present' in one week, but has no participation (e.g., no incoming or outgoing calls or messages) in the following weeks. In step 708, for a plurality of the data chunks, call graph parameters are determined from the data chunks for a plurality of customers. In step 710, a linear discriminant model is run over the identified churners using the determined call graph parameters to find the specific call graph parameters that discriminate churners from non-churners. In step 712, a Modified Logistic Regression may be used to devise a generalized model in the form of Logistic function that can be used to predict if a customer may be a churner or not depending on the independent graph parameters extracted from the Discriminant Analysis. That is, the model can be used to categorize a customer as a churner or a non-churner.

Call Graph Parameter Determination

In some embodiments, the call graph parameters may be determined by generating a call graph. The call graph may be generated using a distributed graph database implemented in Java. In some embodiments, the graph belongs to a class of NOSQL (or Not Only SQL) data technologies that may be focused on graph data structure. In one of the exemplarily embodiments, the graph data may consist of objects or things called nodes and various relationships called edges that may connect two or more nodes, such as illustrated in FIG. 1.

Figure 8:
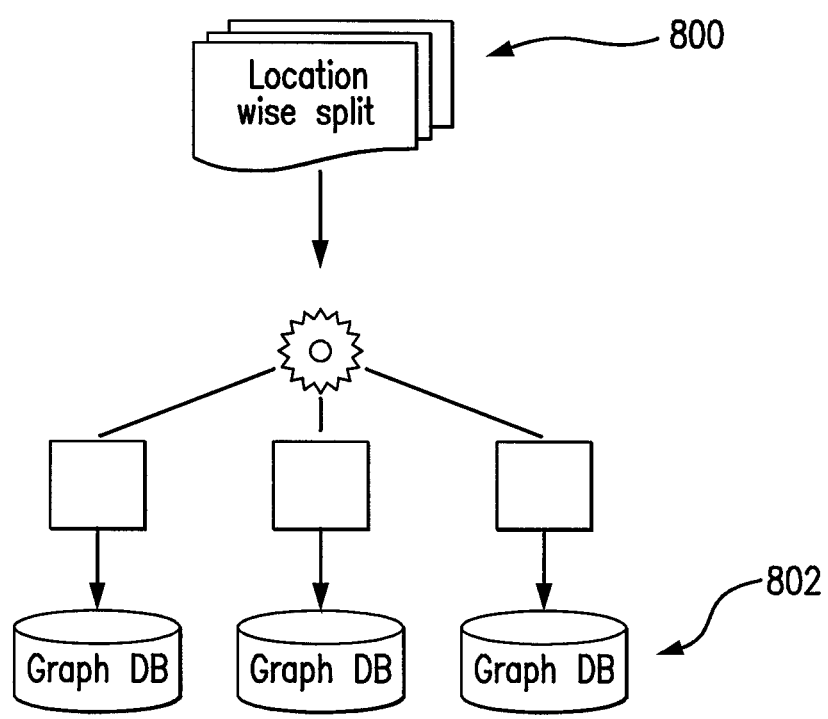
FIG. 8 illustrates a block diagram that depicts a method of generating a graph from a graph database (DB).

FIG. 8 illustrates a block diagram that depicts a method of generating a graph from a graph database (DB) 802. Location wise split data 800 may be picked from the clusters of data gathered from the graph database 402. There may be one or more graph databases from which the data may be extracted. On the basis of the extracted data, the graph may be generated. According to an exemplary embodiment, the graph G may be generated by ingesting the CDRs to create ((V(G), E(G)) pairs, where V(G) represents the vertices in the call graph and E(G) represents the edge connecting two vertex with an edge weight W. The edge weight has two values: first, we initialize it with 1, representing the hop jump and the other value may represent the number of calls made or SMS sent or any other field considered for analysis from the CDR. The graph is visualized at node level and the connections among the nodes are represented using directed edges.

According to an exemplary embodiment, the following steps may be used to derive the final set of call graph parameters. The final model is of the type: y(x)=a1x1+a2x2+ . . .

+aNxN, where: y(x)=0 represent non churner and y(x)=1 represents a churner; each of a1, a2, . . . , aN is a constant for a given graph parameter; and each of x1, x2, . . . , xN is a graph parameter supplied for a given node.

The above flow diagram represents the path for obtaining the final equation. Initially, the graph parameters may be calculated for the available split up data. After obtaining the result for all the splits of data, the Linear Discriminant Analysis is applied over the set of customers with positive churn label (i.e., identified as churners). The graph parameter that contributes to the maximum towards churn behaviour is extracted. Then, the modified Logistic Regression model is run for deriving the final equation whose outcome may probably predict if a customer will churn or not. The final equation consists of set of extracted call graph parameters instead of utilizing all the call graph parameters. This process flow may help to narrow down the parameter analysis to hunt the probable churners in the telecom domain.

Figure 9:
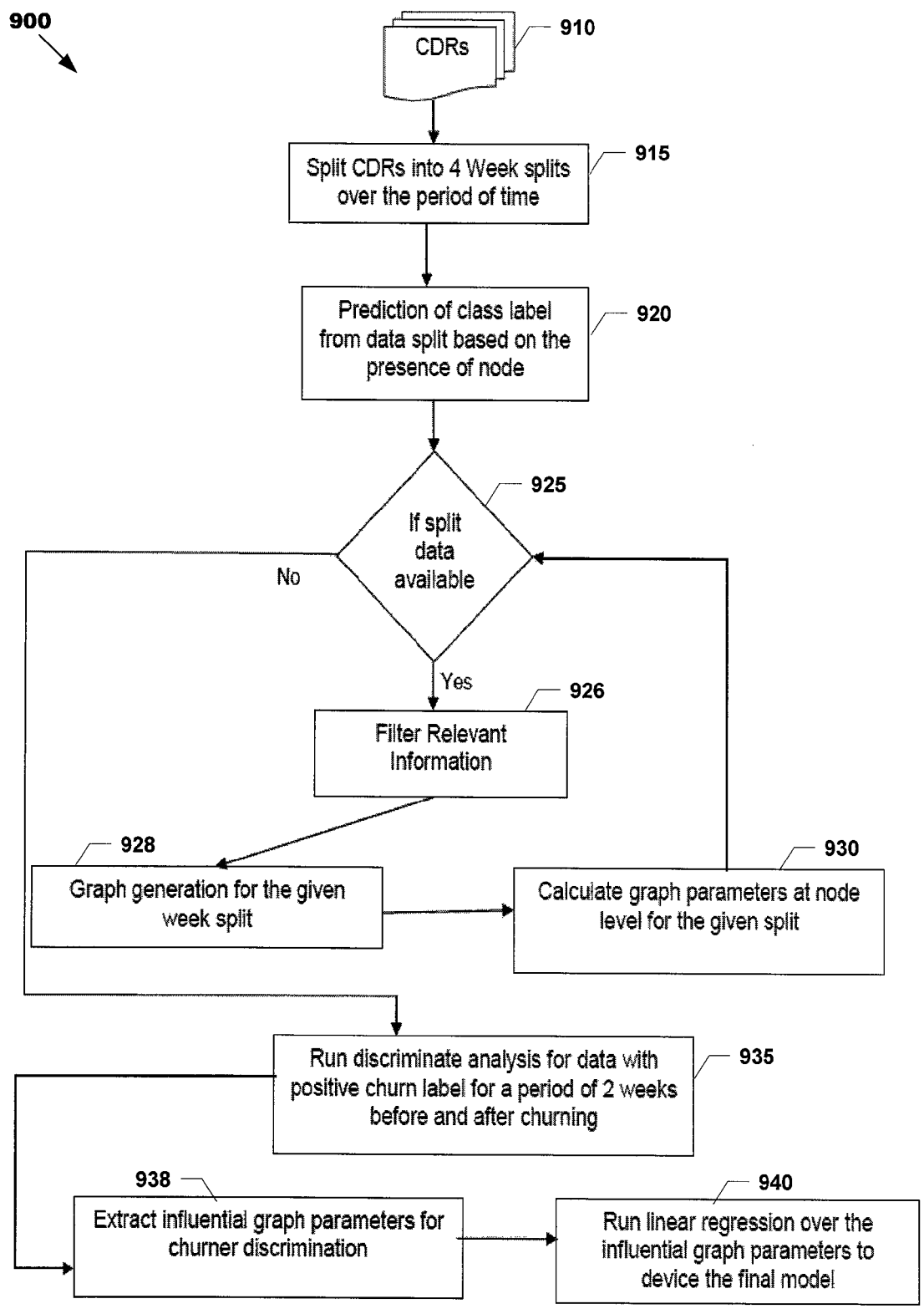
FIG. 9 illustrates a process for identifying churners in a telecom network, according to an embodiment of the disclosure.

FIG. 9 illustrates a process 900 for identifying churners in a telecom network, according to an embodiment of the disclosure. The process 900 includes a set of steps beginning with data ingestion and ending with deriving a generalized model for churn discrimination. As shown in FIG. 9, the CDRs 910 of a large telecom provider is taken as an input. According to an exemplary embodiment, the CDRs may be split into four-week chunks over a period of time as illustrated in step 915, for analysis and churn is determined by analysing the presence of customer in the split data. Next step 920 is to extract various call details such as caller id, called id and call weight, from the split data based on the presence of node. Further, the Graph is visualized for the corresponding split data and exhaustive graph parameter analysis is performed over the generated graph. In step 925, the availability of split data is determined, and in case the split data is available, the relevant information is filtered and a graph is generated for the given week split (steps 926 and 928). The graph parameters at node level of the given split are calculated in step 930. The above process continues for the available splits of data. The discriminant analysis is run over the nodes with positive churn value in step 935, for a period of perhaps two weeks before and after the churn. The graph parameters showing influential variations for discriminating the churn behaviour are thus extracted as a result (step 938). In step 940, the logarithmic regression model is run to derive a generalized model with the selectively chosen graph parameters.

Figure 10:
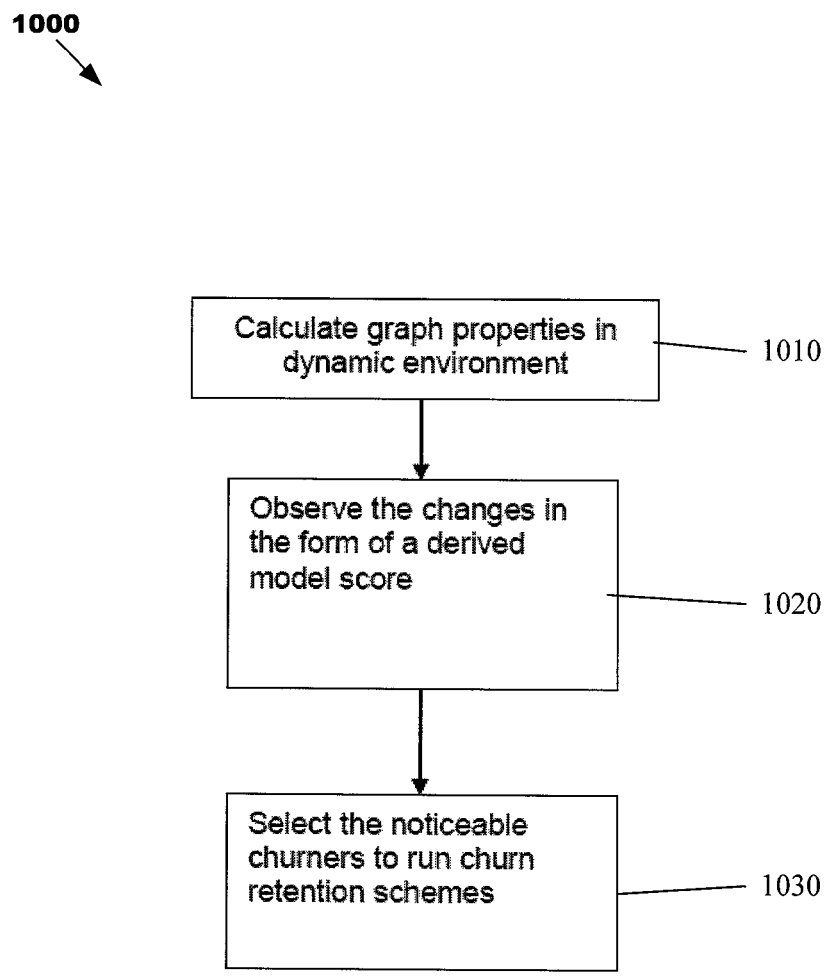
FIG. 10 illustrates a process flow for obtaining a running model for identifying churners, according to an exemplary embodiment.

FIG. 10 illustrates a process flow 1000 for obtaining a running model for identifying churners, according to an exemplary embodiment of the disclosure. Various steps may be undertaken to derive the final model. The flow diagram illustrated in this figure represents a path to obtain the final running model in a dynamic environment, according to some embodiments. In this case, the graph parameters that contribute maximum to churn behaviour may be calculated first, in step 1010. However, the final model parameters may consist of set of extracted graph parameters instead of utilizing the whole graph parameters.

This process flow when implemented, narrows down the parameter analysis in terms of the steps performed and the time and cost incurred, to identify the probable churners in the telecom domain. In step 1020 of the process flow, the linear discriminant analysis is run over the churners to find out specific parameters to discriminate the churners. Finally in step 1030, the probable churners may be determined who may be thereafter encouraged to retain with the existing telecom service provider, through various churn retention schemes.

The disclosed method and system can very quickly identify churners in a large data according to various disclosed embodiments. For example the disclosed method and system can find churner in a telecommunication network of 20 million users in just twenty minutes.

Figure 11:
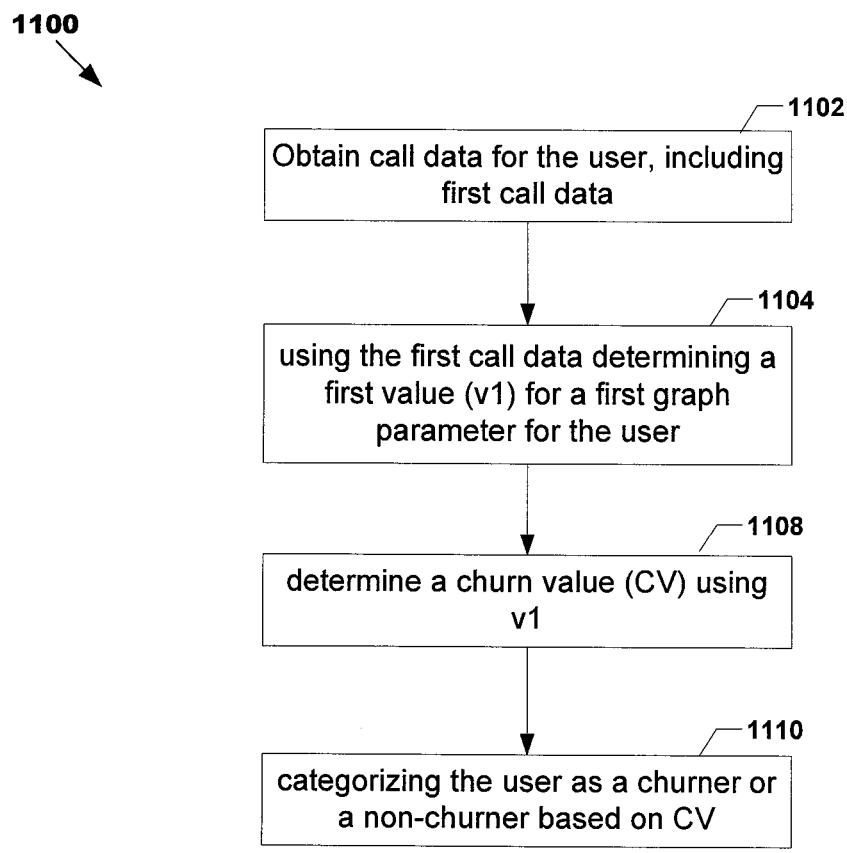
FIG. 11 is a flowchart illustrating a method for categorizing a customer as a churner or non-churner according to an exemplifying embodiment.

FIG. 11 illustrates a process 1100 for categorizing a user of a communication service as a churner or non-churner. Process 1100 may begin in step 1102, in which call data is obtained for the user. The call data may include a first set of call data.

In step 1104, the first set of call data is used to determine a value (v1) for a graph parameter for the user, the graph parameter being one of any of the graph parameters mentioned above. In some embodiments, the graph parameter is one of the following graph parameters: (a) an out-degree (OD) parameter, (b) a Shapley Value (SV) parameter, (c) a proximity prestige (PP) parameter, and (d) closeness centrality (CC) parameter.

In step 1108, value v1 is used to determine a churn value (cv) for the user. For example, in step 1106, cv may be determined by inputting value v1 into a model (as described above).

In step 1110, the user is categorized as a churner or a non-churner based on said churn value (cv).

In some embodiments, the model has the following form:

$$Y = -4.718 + 2.267(CC2 - CC1) - 0.510(OD2 - OD1) + 1.546(PP2 - PP1) - 1.22(SV2 - SV1),$$

where CC1 and CC2 are first and second CC parameter values for a particular user. Like CC1 and CC2, OD1, OD2, PP1, PP2, SV1, and SV2 are first and second OD, PP and SV parameter values for the particular user, respectively. Whether the user is categorized as a churner or non-churner depends on the value of Y. For example, The user may be categorized as a churner when Y=1 and a non-churner when Y=0.

Figure 12:
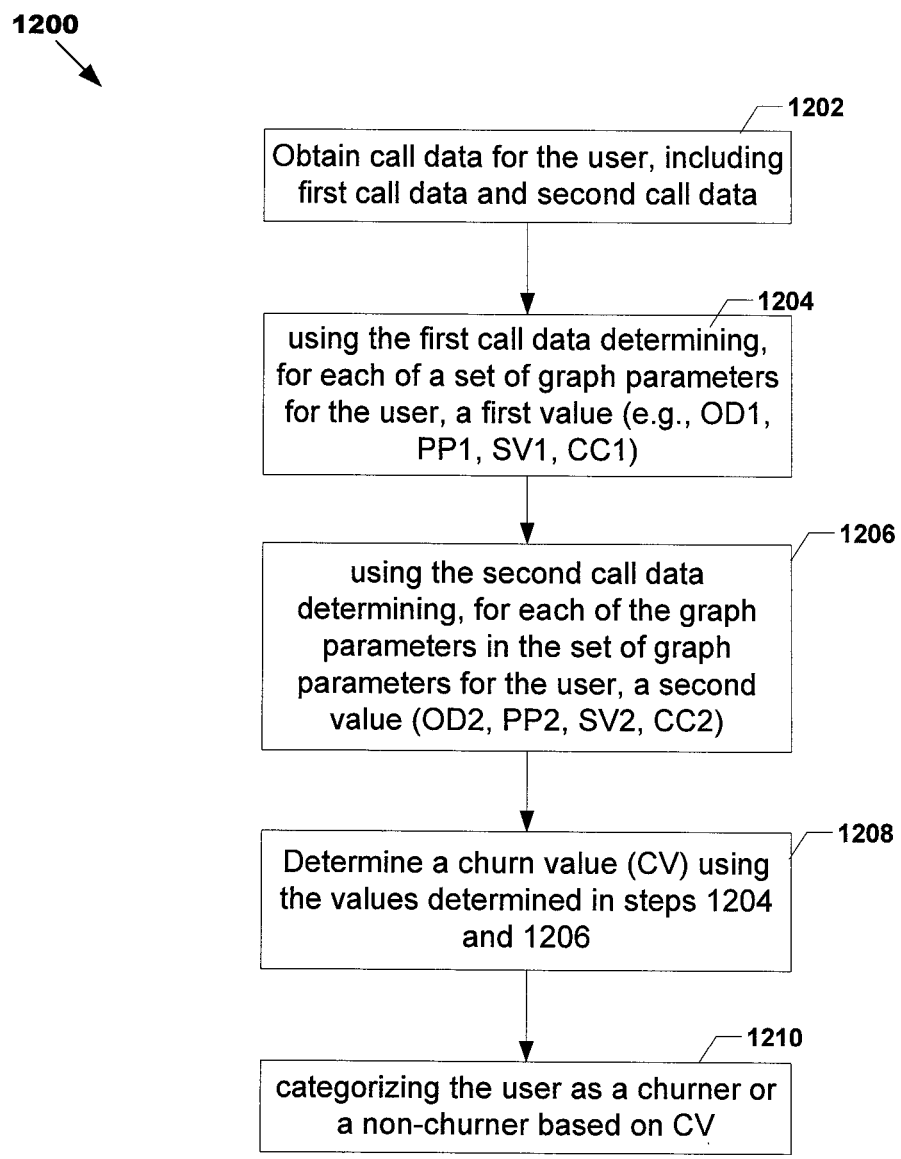
FIG. 12 is a flowchart illustrating a method for categorizing a customer as a churner or non-churner according to an exemplifying embodiment.

Because in some embodiments Y is a function of first and second values for several graph parameters, process 1100 may be extended, as shown in FIG. 12.

FIG. 12 illustrates a process 1200 for categorizing a user of a communication service as a churner or non-churner. Process 1200 may begin in step 1202, in which call data is obtained for the user. The call data may include a first set of call data and a second set of call data for a set of users.

The first set of call data may consist of CDRs for the users for a first period of time (P1) and the second set of call data may consist of CDRs for the users for a second period of time (P2). P2 may immediately follow P1. P1 and P2 may be a week or other period of time.

The first and second sets of call data contain a sufficient amount of call data (e.g., a sufficient number of CDRs) such that a first call graph (see e.g., FIG. 1) can be created from the first set of call data and a second call graph (see e.g., FIG. 2) can be created from the second set of call data. Additionally, the first and second call graphs contain a sufficient amount of information such that a first set of call graph parameters values for a particular user and a particular set of graph parameters can be generated from the call graph information from the first call graph and a second set of call graph parameters values for the particular user and the particular set of graph parameters can be generated from the call graph information from the second call graph.

In step 1204, for each graph parameter included in the set of graph parameters, determine a corresponding graph parameter value for the particular user (e.g., determine OD1, PP1, SV1, CC1) using the first set of call data (e.g., the first call graph).

In step 1206, for each graph parameter included in the set of graph parameters, determine a corresponding graph parameter value for the particular user (e.g., determine OD2, PP2, SV2, CC2) using the second set of call data (e.g., the second call graph).

In step 1208, a churn value (CV) is determined using the graph parameter values determined in step 1204 and 1206. For example, in step 1208 CV is determined using the an equation of the form:

$$CV = a0 + a1(CC2-CC1) + a2(OD2-OD1) + a3(PP2-PP1) + a4(SV2-SV1),$$

Where a0, a1, a2, a3, and a4 are constants. In some embodiments, CV is determined using this equation:

$$CV = -4.718 + 2.267(CC2-CC1) - 0.510(OD2-OD1) + 1.546(PP2-PP1) - 1.22(SV2-SV1)$$

In step 1210, the user is categorized as a churner or non-churner based on the value of CV determined in step 1208.

The embodiments of the disclosure may, of course, in some embodiments, be implemented using a single computer, or a system having one or more computers comprising various modules to performed the various disclosed function of the method.

Figure 13:
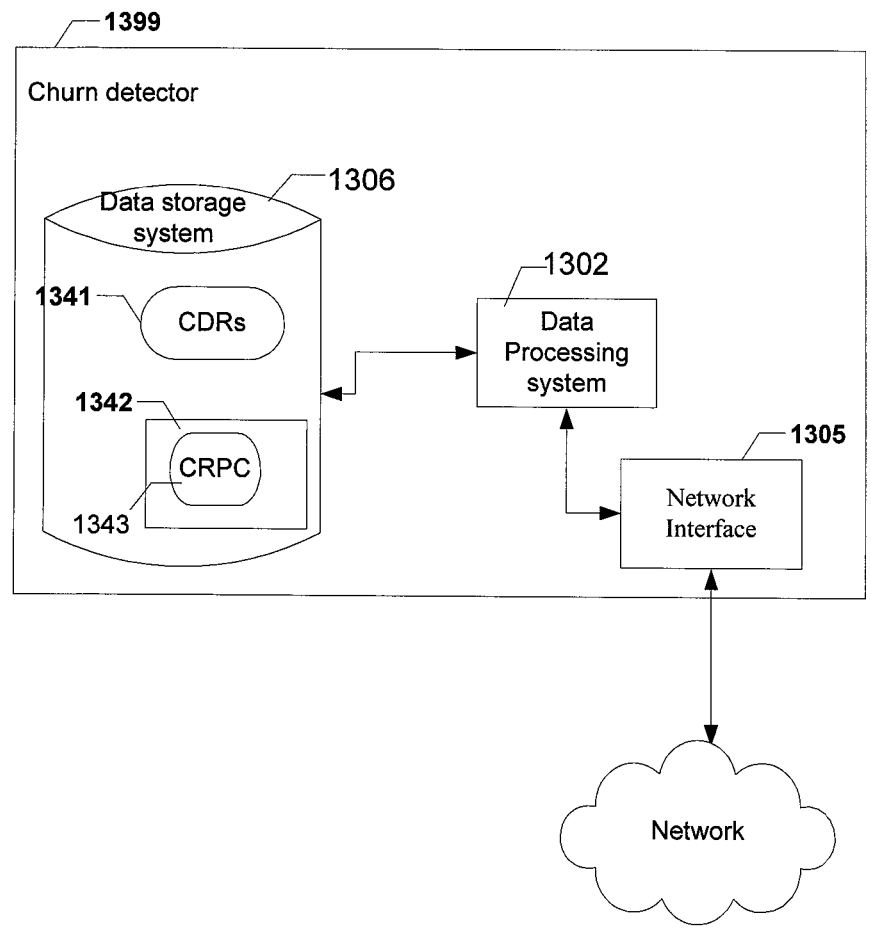
FIG. 13 is a block diagram illustrating a churner detector apparatus according to an exemplifying embodiment.

Referring now to FIG. 13, FIG. 13 illustrates a block diagram of a churn detector apparatus 1399 according to some embodiments. As shown in FIG. 13, the churn detector 1399 may include: a data processing system 1302, which may include one or more data processing devices each having one or more microprocessors and/or one or more circuits, such as an application specific integrated circuit (ASIC), Field-programmable gate arrays (FPGAs), etc; a network interface 1305 for connecting the apparatus 1399 to a network; a data storage system 1306, which may include one or more computer-readable mediums, such as non-volatile storage devices and/or volatile storage devices (e.g., random access memory (RAM)). As shown, data storage system 1306 may store a large set of CDRs 1341.

In embodiments where data processing system 1302 includes a processor (e.g., a microprocessor), a computer program product is provided, which computer program product includes: computer readable program code 1343, which implements a computer program, stored on a computer readable medium 1342, such as, but not limited to, magnetic media (e.g., a hard disk), optical media (e.g., a DVD), memory devices (e.g., random access memory), etc. In some embodiments, computer readable program code 1343 is configured such that, when executed by data processing system 1302, code 1343 causes the processing system 1302 to perform steps described above (e.g., steps describe above with reference to the flow charts shown in the drawings).

In other embodiments, the apparatus 1399 may be configured to perform steps described above without the need for code 1343. For example, data processing system 1302 may consist merely of specialized hardware, such as one or more application-specific integrated circuits (ASICs). Hence, the features of the present invention described above may be implemented in hardware and/or software. For example, in some embodiments, the functional components of the apparatus described above may be implemented by data processing system 1302 executing computer instructions 1343, by data processing system 1302 operating independent of any computer instructions 1343, or by any suitable combination of hardware and/or software.

While various embodiments of the present invention have been described above, it should be understood that they have been presented by way of example only, and not limitation. Thus, the breadth and scope of the present invention should not be limited by any of the above-described exemplary embodiments. Moreover, any combination of the above-described elements in all possible variations thereof is encompassed by the invention unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for categorizing a user of a communication service as a churner or non-churner, the method comprising:
    obtaining first call data for the user, the first call data identifying communications form the user that were made during a first period of time;
    obtaining second call data for the user, the second call data identifying communications from the user that were made during a second period of time;
    using the first call data to determine a first value (v1) for a first graph parameter for the user;
    using the second call data to determine a second value (v2) for the first graph parameter;
    using the first call data to determine a third value (v3) for a second graph parameter for the user, the second graph parameter different from the first graph parameter;
    using the second call data to determine a fourth value (v4) for the second graph parameter;
    using the determined values v1, v2, v3, and v4 to determine a churn value (cv); and
    categorizing the user as a churner or a non-churner based on said churn value.

2. The method of claim 1, wherein the churn value is determined by calculating c1*(v2−v1), wherein c1 is a predetermined constant.

3. The method of claim 1,
    wherein the first graph parameter is one of an (a) out-degree parameter, (b) Shapley Value parameter, (c) a proximity prestige parameter, and (d) closeness centrality parameter, and
    wherein the second graph parameter being one of: (a) an out-degree parameter, (b) a Shapley Value parameter, (c) a proximity prestige parameter, and (d) closeness centrality parameter.

4. The method of claim 3, wherein the churn value is determined by calculating c1*(v2−v1) and c2*(v4−v3), wherein c2 is a predetermined constant.

5. The method of claim 3, further comprising:
    using the first call data determining a fifth value (v5) for a third graph parameter for the user, the third graph parameter being one of: (a) an out-degree parameter, (b) a Shapley Value parameter, (c) a proximity prestige parameter, and (d) closeness centrality parameter; and
    using the second call data determining a sixth value (v6) for the third graph parameter, wherein
    the churn value is determined using v1, v2, v3, v4, v5 and v6, and
    the third graph parameter is different than the first graph parameter and the second graph parameter.

6. The method of claim 5, wherein the churn value is determined by calculating c1*(v2−v1), c2*(v4−v3), and c3*(v6−v5), wherein c3 is a predetermined constant.

7. The method of claim 5, further comprising:
    using the first call data determining a seventh value (v7) for a fourth graph parameter for the user, the fourth graph parameter being one of: (a) an out-degree parameter, (b)

a Shapley Value parameter, (c) a proximity prestige parameter, and (d) closeness centrality parameter; and using the second call data determining an eighth value (v8) for the fourth graph parameter, wherein the churn value is determined using v1, v2, v3, v4, v5, v6, v7 and v8 and the fourth graph parameter is different than the first graph parameter, the second graph parameter, and the third graph parameter.

8. The method of claim 7, wherein the churn value is determined by calculating c1*(v2−v1), c2*(v4−v3), c3*(v6−v5), c4*(v8−v7) wherein c4 is a predetermined constant.

9. The method of claim 7, wherein the churn value is determined by calculating c5+c1*(v2−v1)+c2*(v4−v3)+c3*(v6−v5)+c4*(v8−v7), wherein c5 is a predetermined constant.

10. The method of claim 2, wherein the first period of time is first one week period of time, and the second period of time is second one week period of time that immediately follows the first one week period of time.

11. A churn detector, the churn detector being configured to:

obtain first call data for a user, the first call data identifying communications form the user that were made during a first period of time;

obtain second call data for the user, the second call data identifying communications from the user that were made during a second period of time;

use the first call data to determine a first value (v1) for a first graph parameter for the user;

use the second call data to determine a second value (v2) for the first graph parameter;

use the first call data to determine a third value (v3) for a second graph parameter for the user, the second graph parameter different from the first graph parameter;

use the second call data to determine a fourth value (v4) for the second graph parameter;

use the determined values v1, v2, v3, and v4 to determine a churn value (cv); and categorize the user as a churner or a non-churner based on said churn value.

12. The churn detector of claim 11, wherein the churn value is determined by calculating c1*(v2−v1), wherein c1 is a predetermined constant.

13. The churn detector of claim 11, wherein the first graph parameter is one of an (a) out-degree parameter, (b) Shapley Value parameter, (c) a proximity prestige parameter, and (d) closeness centrality parameter, and wherein the second graph parameter being one of: (a) an out-degree parameter, (b) a Shapley Value parameter, (c) a proximity prestige parameter, and (d) closeness centrality parameter.

14. The churn detector of claim 13, wherein the churn value is determined by calculating c1*(v2−v1) and c2*(v4−v3), wherein c2 is a predetermined constant.

15. The churn detector of claim 13, wherein the churn detector is further configured to:

use the first call data determining a fifth value (v5) for a third graph parameter for the user, the third graph parameter being one of: (a) an out-degree parameter, (b) a Shapley Value parameter, (c) a proximity prestige parameter, and (d) closeness centrality parameter; and use the second call data determining a sixth value (v6) for the third graph parameter, wherein the churn value is determined using v1, v2, v3, v4, v5 and v6, and the third graph parameter is different than the first graph parameter and the second graph parameter.

16. The churn detector of claim 15, wherein the churn value is determined by calculating c1*(v2−v1), c2*(v4−v3), and c3*(v6−v5), wherein c3 is a predetermined constant.

17. The churn detector of claim 15, wherein the churn detector is further configured to:

use the first call data determining a seventh value (v7) for a fourth graph parameter for the user, the fourth graph parameter being one of: (a) an out-degree parameter, (b) a Shapley Value parameter, (c) a proximity prestige parameter, and (d) closeness centrality parameter; and use the second call data determining an eighth value (v8) for the fourth graph parameter, wherein the churn value is determined using v1, v2, v3, v4, v5, v6, v7 and v8 and the fourth graph parameter is different than the first graph parameter, the second graph parameter, and the third graph parameter.

18. The churn detector of claim 17, wherein the churn value is determined by calculating c1*(v2−v1), c2*(v4−v3), c3*(v6−v5), c4*(v8−v7) wherein c4 is a predetermined constant.

19. The churn detector of claim 17, wherein the churn value is determined by calculating c5+c1*(v2−v1)+c2*(v4−v3)+c3*(v6−v5)+c4*(v8−v7), wherein c5 is a predetermined constant.

20. The churn detector of claim 11, wherein the first period of time is first one week period of time, and the second period of time is second one week period of time that immediately follows the first one week period of time.

21. A computer program product comprising a non-transitory computer readable medium storing a computer code for categorizing a user of a communication service as a churner or non-churner, the computer code comprising:

computer code for obtaining first call data for the user, the first call data identifying communications form the user that were made during a first period of time;

computer code for obtaining second call data for the user, the second call data identifying communications from the user that were made during a second period of time;

computer code for using the first call data to determine a first value (v1) for a graph parameter for the user;

computer code for using the second call data to determine a second value (v2) for the first graph parameter;

computer code for using the first call data to determine a third value (v3) for a second graph parameter for the user, the second graph parameter different from the first graph parameter;

computer code for using the second call data to determine a fourth value (v4) for the second graph parameter;

computer code for using the determined values v1, v2, v3, and v4 to determine a churn value (cv); and computer code for categorizing the user as a churner or a non-churner based on said churn value.

22. The computer program product of claim 21, wherein the computer code for determining the churn value comprises computer code for calculating c1*(v2−v1), wherein c1 is a predetermined constant.

23. The method according to claim 1, further comprising:

using a discriminating analysis model to determine whether the determined value (v1) discriminates between churners and non-churners, wherein the determined value (v1) is used to determine the churn value (cv) if the determined value (v1) discriminates between churners and non-churners.

24. The method according to claim 3, wherein the out-degree parameter measures a number of outgoing connections from the user.

25. The method according to claim 1, wherein the Shapley Value parameter is defined as:

$$SV_i = \sum_{v_j \in v \cup N(v_j,d)} \frac{1}{1+deg(v_j)},$$

where $N(v_j, d)$ represents d degree of separation from node $v_i$.

26. The method according to claim 1, wherein proximity prestige parameter is defined as:

$$PP_i \frac{\frac{k_i}{|V|-1}}{\frac{1}{k_i} \sum_{j=1, j \in V}^{k_i} d_{i,j}},$$

where $d_{i,j}$ represents a length of a shortest path between vertex $v_i$ and vertex $v_j$, and $k_i$ represents a number of nodes in a network that can reach vertex $v_i$.

27. The method according to claim 1, wherein the closeness centrality parameter for the user is defined as $1/l_i$, where $l_i$ is defined as:

$$l_i = \frac{1}{|v|} \sum_{j \in v} d_{i,j},$$

where $d_{i,j}$ represents a length of a shortest path between vertex $v_i$ and vertex $v_j$.

28. The method according to claim 23, wherein the discriminating analysis model accepts the determined value (v1) as input, and outputs a probability value between 0 to 1, wherein, in response to determining that the probability value is greater than a predetermined threshold, the determined value (v1) is determined to discriminate between churners and non-churners and used to determine the churn value (cv).

29. The method according to claim 1, further comprising:

applying a discriminating analysis model to a plurality of graph parameters, the discriminatory analysis model outputting a probability value between 0 to 1 for each graph parameter included in the plurality of graph parameters; and using the graph parameters from plurality of graph parameters having a probability value greater than a predetermined threshold to determine the churn value (cv).

30. The method of claim 1, wherein the first period of time is first one week period of time, and the second period of time is second one week period of time that immediately follows the first one week period of time.

* * * * *